(12) United States Patent
Cannistraro et al.

(10) Patent No.: US 10,847,129 B2
(45) Date of Patent: Nov. 24, 2020

(54) DATA FORMAT

(71) Applicant: Weav Music Limited, London (GB)

(72) Inventors: Alan Cannistraro, London (GB); Daniel Danilatos, London (GB); Zhi Frank Huang, London (GB); Nick Launay, London (GB); Lars Rasmussen, London (GB); Georgia Elomida Visviki, London (GB)

(73) Assignee: Weav Music Limited, London (GB)

( * ) Notice: Subject to any disclaimer, the term of this patent is extended or adjusted under 35 U.S.C. 154(b) by 0 days.

(21) Appl. No.: 16/467,925

(22) PCT Filed: Dec. 7, 2017

(86) PCT No.: PCT/GB2017/053690
§ 371 (c)(1),
(2) Date: Jun. 7, 2019

(87) PCT Pub. No.: WO2018/104744
PCT Pub. Date: Jun. 14, 2018

(65) Prior Publication Data
US 2020/0074965 A1 Mar. 5, 2020

(30) Foreign Application Priority Data
Dec. 7, 2016 (GB) .................... 1620839.9

(51) Int. Cl.
*G10H 1/00* (2006.01)
(52) U.S. Cl.
CPC ..... *G10H 1/0025* (2013.01); *G10H 2210/076* (2013.01); *G10H 2210/125* (2013.01); *G10H 2210/385* (2013.01); *G10H 2240/121* (2013.01)

(58) Field of Classification Search
CPC .. G10H 1/40; G10H 2210/076; G10H 1/0008; G10H 2240/131; G10H 2210/391; G10H 2210/375
See application file for complete search history.

(56) References Cited

U.S. PATENT DOCUMENTS 6,703,549 B1 * 3/2004 Nishimoto ............. G10H 7/002
84/609
2003/0104785 A1 6/2003 Iwanaga
(Continued)

FOREIGN PATENT DOCUMENTS

| EP | 1557836 | 7/2005 |
|---|---|---|
| WO | WO2018104744 | 6/2018 |
| WO | WO2018104745 | 6/2018 |

OTHER PUBLICATIONS

International Search Report and Written Opinion dated Mar. 8, 2018 in International Patent Application No. PCT/GB2017/053691.
(Continued)

*Primary Examiner* — Marlon T Fletcher
(74) *Attorney, Agent, or Firm* — Byrne Poh LLP

(57) ABSTRACT

A method for constructing an adaptive media file comprising a plurality of audio components configured to be used to form an audio output arranged to have a controllable tempo, the method comprising providing first audio data associated with a first audio component of the plurality of audio components, setting a playback tempo range of the first audio data, providing second audio data associated with the first audio component, setting a playback tempo range of the second audio data, wherein the tempo range of the second audio data is different to the tempo range of the first audio data, and associating the first audio data, the second audio data and the respective playback tempo ranges.

26 Claims, 9 Drawing Sheets

(56) References Cited

U.S. PATENT DOCUMENTS

| | | | |
|---|---|---|---|
| 2006/0107822 A1* | 5/2006 | Bowen | G10H 1/0008 84/612 |
| 2009/0049979 A1* | 2/2009 | Naik | G10H 1/40 84/636 |
| 2009/0157203 A1 | 6/2009 | Bregar et al. | |
| 2010/0168879 A1 | 7/2010 | Takatsuka et al. | |
| 2013/0263720 A1 | 10/2013 | Sugano | |
| 2014/0260911 A1* | 9/2014 | Maezawa | G10H 7/002 84/612 |
| 2014/0338516 A1* | 11/2014 | Andri | G10H 1/40 84/612 |

OTHER PUBLICATIONS

International Search Report and Written Opinion dated Mar. 14, 2018 in International Patent Application No. PCT/GB2017/053690.
U.S. Appl. No. 16/467,919, filed Jun. 7, 2019.
Examination Report dated May 11, 2020 in EP Patent Application No. 17817050.2, pp. 1-6.
Office Action dated Apr. 30, 2020 in U.S. Appl. No. 16/467,919, pp. 2-14.
Office Action dated Sep. 8, 2020 in U.S. Appl. No. 16/467,919, pp. 2-15.
Office Action dated Aug. 27, 2020 in CN Patent Application No. 201780085855.0, pp. 1-14.

\* cited by examiner

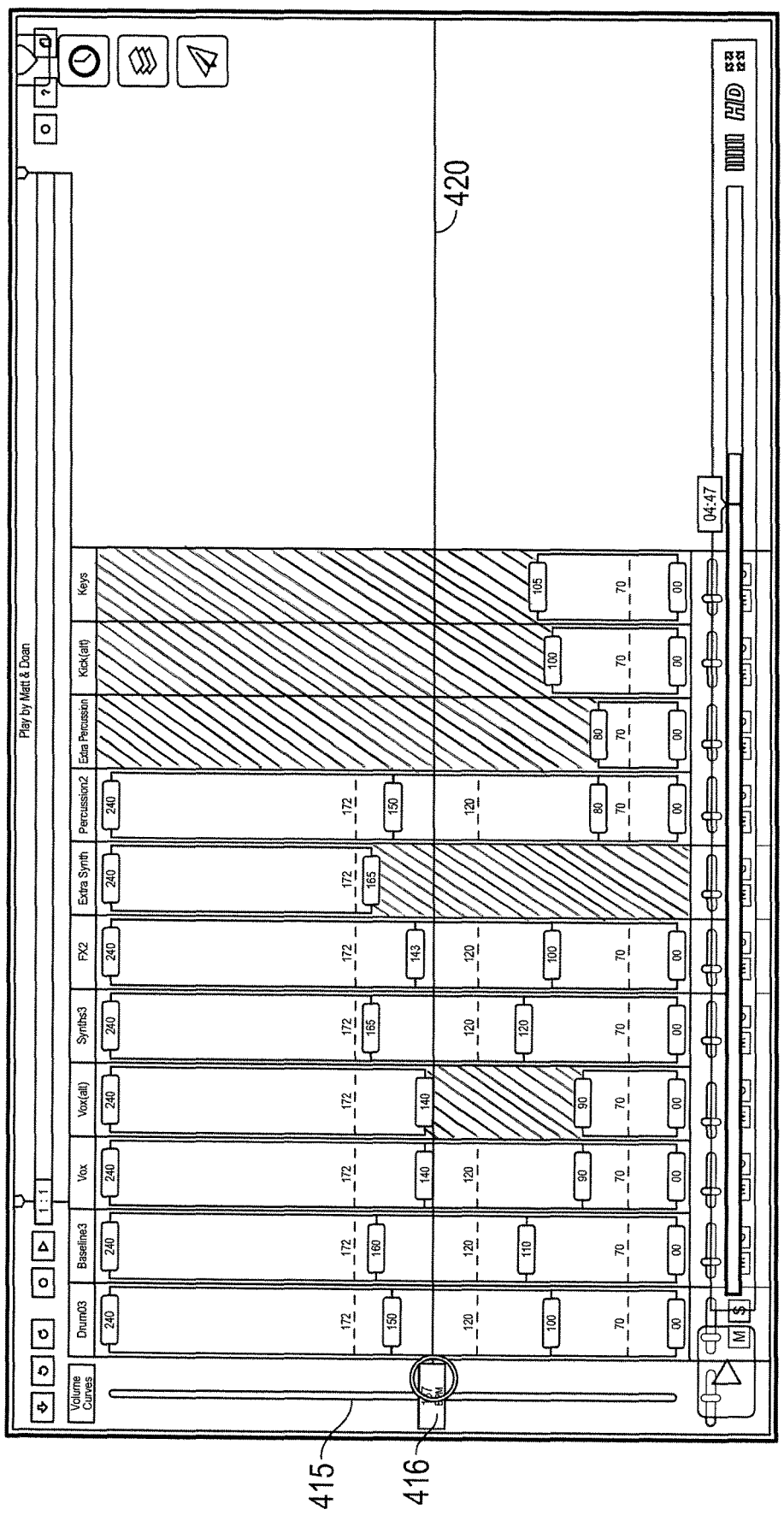
Figure 4.1

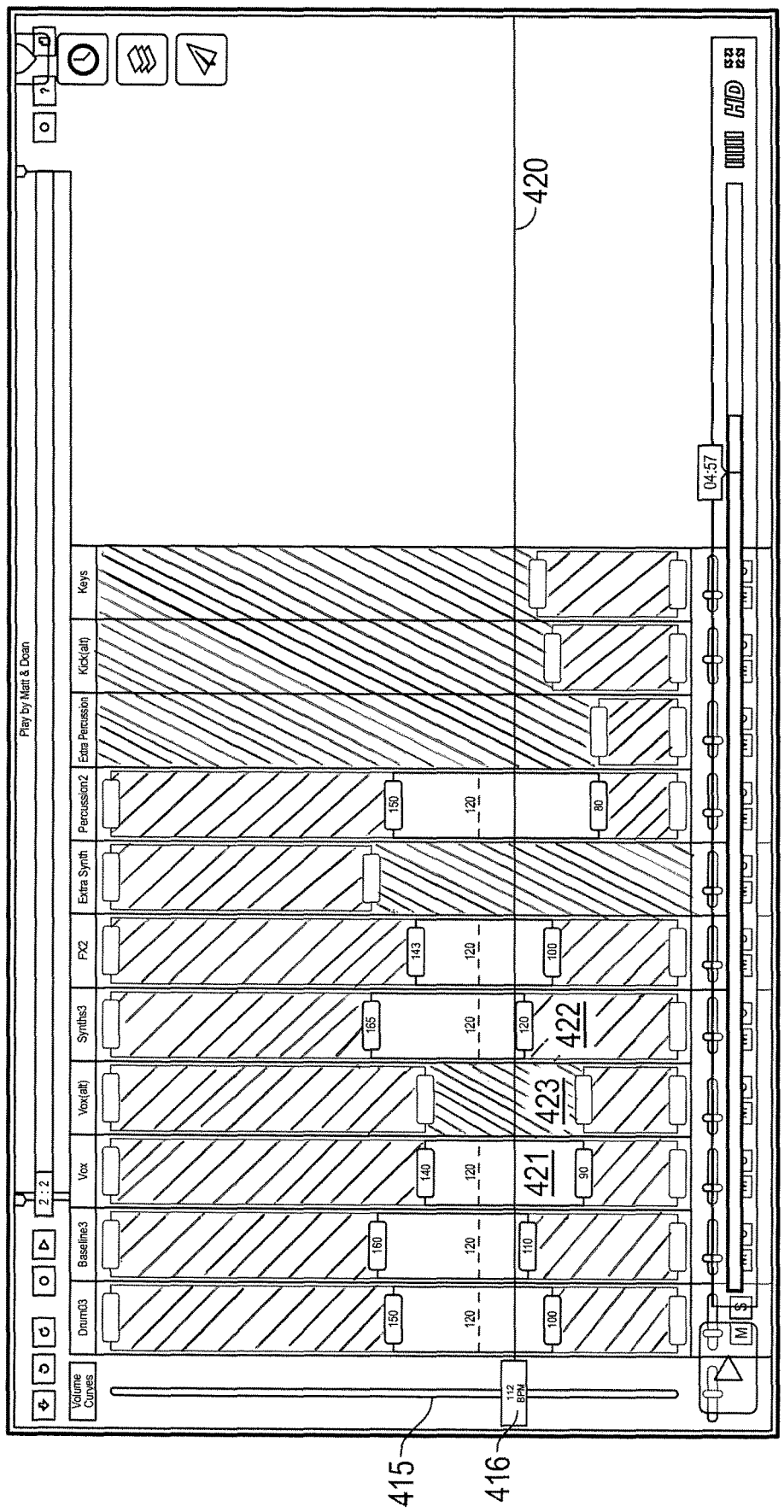
Figure 4.2

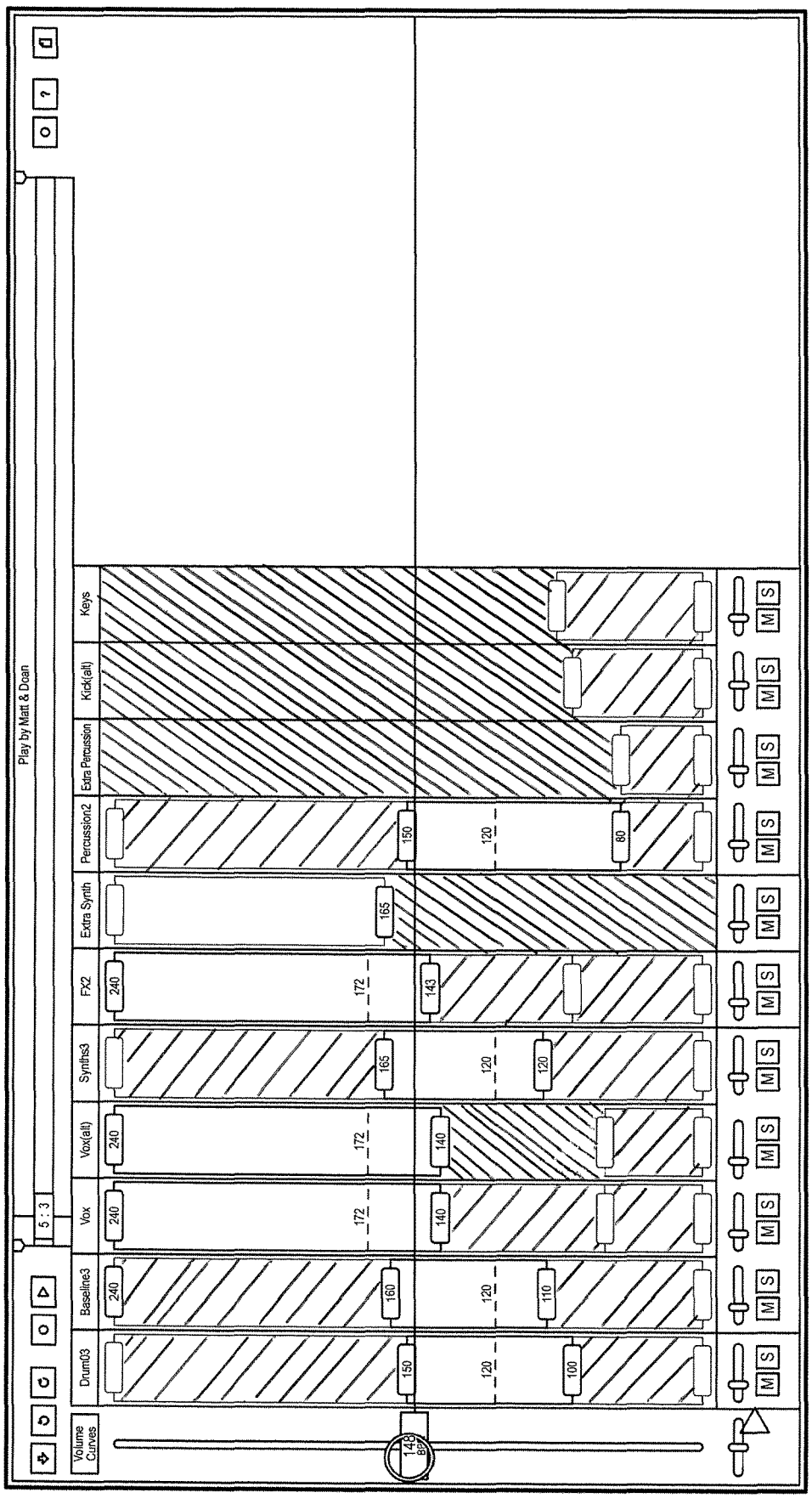
Figure 4.3

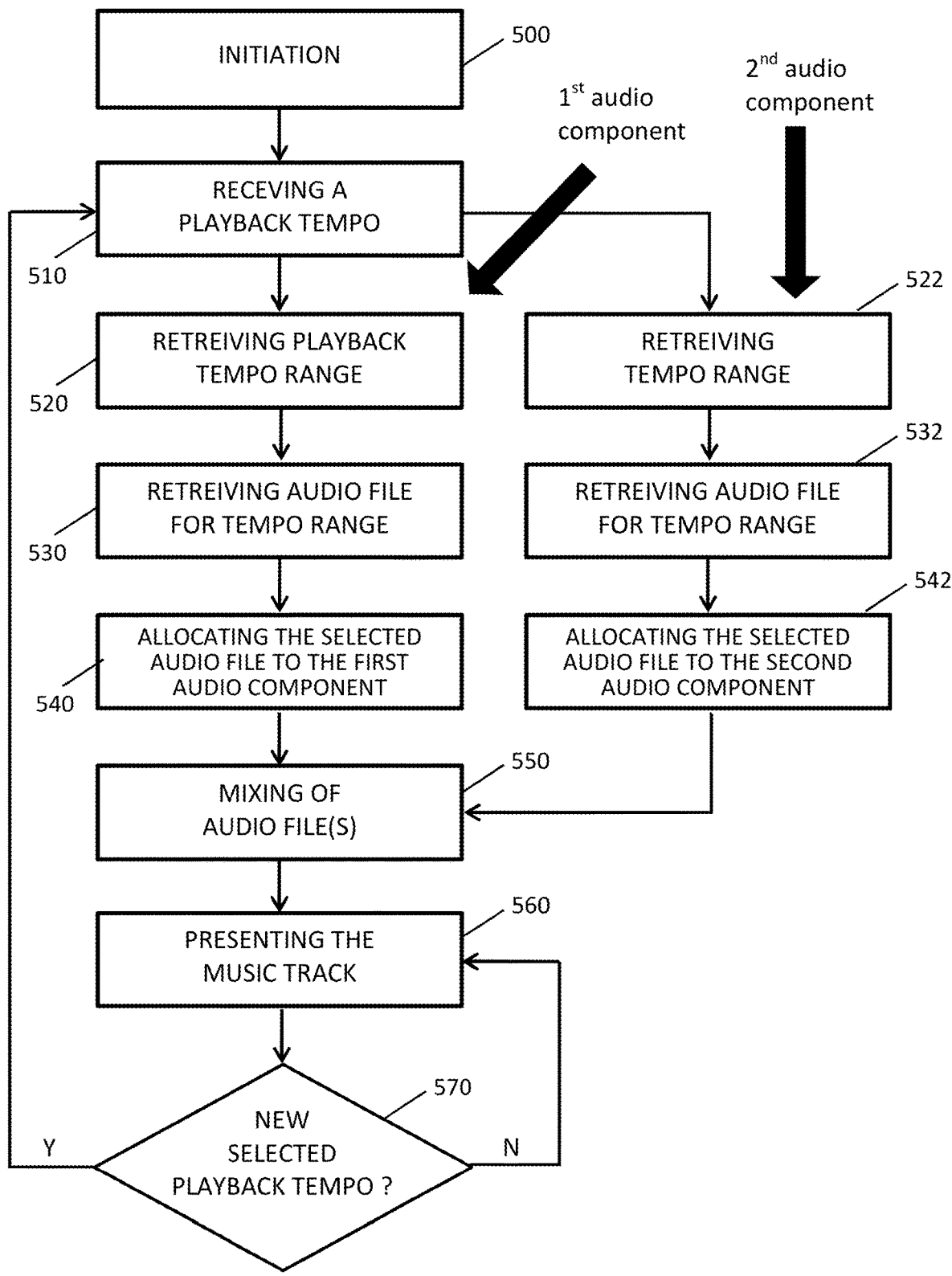
Figure 5.1

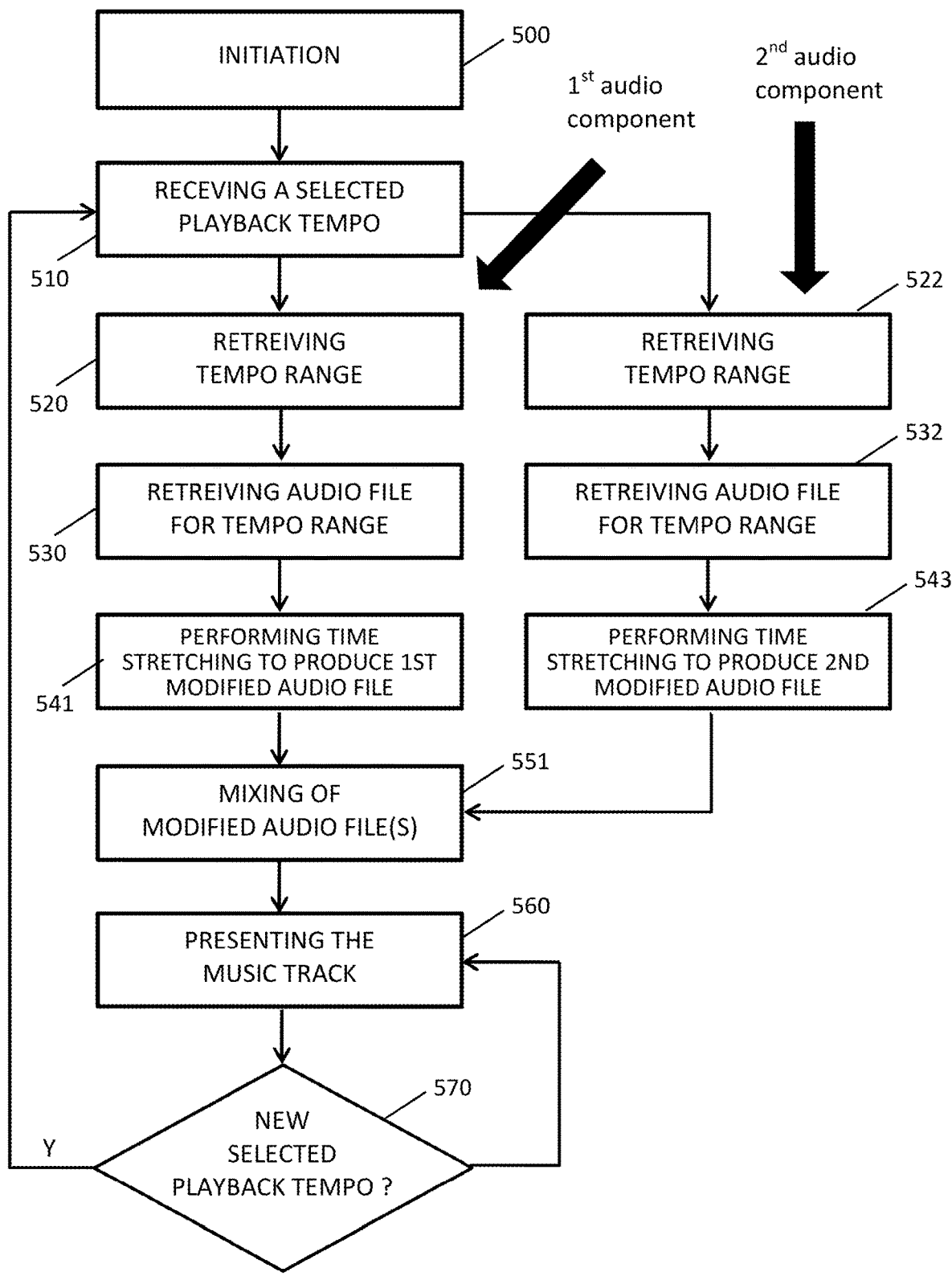
Figure 5.2

DATA FORMAT

FIELD

The present disclosure relates to a method for constructing a media file and the associated file. More specifically, but not exclusively, an audio file type that allows for audio to be played back at different tempos is presented. Also discussed is a method for controlling the playback tempo a music track is presented at. Numerous other applications will be evident on the basis of the discussion below.

BACKGROUND

In the music industry, many standards and successful music tracks are often remixed, i.e. reworked, to create a different song. Even if the melody is kept for the most part, the remix will generally change the song's original rhythm or BPM (beat per minute) to create a different atmosphere or ambiance. The song can be accelerated to give it a clubbing touch and slowed down to give it a more lounge input.

Songs or music tracks are generally the result of mixing of several sets of audio data, for instance 8 sets of audio data, each set of audio data corresponding to an audio channel which is allocated a specific function (vocal 1, vocal 2, beat . . . ) or instrument (piano, guitar, harp, saxophone, base . . . ). Each set of audio data, and consequently the music track itself, is characterized by a playback tempo it is intended to be presented or played at. The playback tempo generally corresponds to the original BPM at which the different sets of audio data were recorded. The audio channels, more specifically the allocated sets of audio data, are generally reworked by music editors to produce an original arrangement for the music track that can please audiences.

Changing the playback tempo is a complex process as the original arrangement can be significantly affected. The main disruption is that the pitch of the arrangement is usually deeply impacted, making the song sound "bizarre" or "off" to the ear. The remix will generally consist of both an artistic and technical work to change the playback tempo while producing a new arrangement that remains pleasing to the ear. To help with the technical work, different tools are available today such as time stretching a set of audio data. Time stretching consists of transforming a set of audio data from an original playback tempo that it was initially intended for into a modified set of audio data associated with a different playback tempo. The transformation allows a control of the pitch so that the difference in playback tempo reduces the effect on the artistic arrangement.

The issue with time stretching is that the range of playback tempos that are allowed before the impact gets out of control is fairly limited. Past a certain percentage increase or decrease in the original playback tempo, the available tools as well as the artistic skills of a music editor cannot compensate for the coarse deformation of the arrangement and original audio samples.

There is still a need today for a method to change the playback tempo of a music track over a large range of values while limiting the degradation sensed by one's ears. Specifically, there is a need to effect such a change of tempo while a listener is listening to the music track.

SUMMARY

According to an aspect, there is provided a method for constructing an adaptive media file comprising a plurality of audio components configured to be used to form an audio output arranged to have a controllable tempo, the method comprising providing first audio data associated with a first audio component of the plurality of audio components, setting a playback tempo range of the first audio data, providing second audio data associated with the first audio component, setting a playback tempo range of the second audio data, wherein the tempo range of the second audio data is different to the tempo range of the first audio data, and associating the first audio data, the second audio data and the respective playback tempo ranges.

Optionally, the first audio data, the second audio data and the respective playback tempo ranges are associated by placing them within a file structure. Optionally, the first audio data, the second audio data and respective playback tempo ranges are associated by reference in metadata associated with the first and second audio data. Optionally, the playback tempo range of the first audio data is incorporated in metadata of the first audio data.

Optionally, the playback tempo range of the first audio data provides data representative of a lower tempo and an upper tempo. Optionally, during playback the first audio data is arranged to be presented as part of the audio output when a playback tempo is either above the lower tempo and below the higher tempo, or above or equal to the lower tempo and below or equal to the higher tempo. Optionally, the first audio data has a tempo and the data representative of the lower tempo and the upper tempo is one of the actual upper tempo and the actual lower tempo, a number of beats per minute above and a number of beats per minute below a tempo of the first audio data.

Optionally, the tempo range of the first audio data defines a maximum and a minimum tempo to which the first audio data is to be time stretched. Optionally, the providing is achieved by one or more of recording sound to form the audio data, creating the audio data using an audio production tool, or importing the audio data.

Optionally, the first audio data and the second audio data either are first and second audio files or derived from first and second audio files. Optionally, associating the first audio data, the second audio data and the respective playback tempo ranges is based on one or more configuration files comprised in the adaptive media file. Optionally, the first audio data being associated with the first audio component of the plurality of audio components is identified within the adaptive media file. Optionally, the adaptive media file is one of an audio file or a video file comprising video frame data and associated audio data.

According to a further aspect, there is provided a computer readable medium comprising computer readable instructions configured, in use, to enable a processor to perform the method.

According to a further aspect, there is provided an adaptive media file for providing data comprising a plurality of audio components for forming an audio output arranged to have a controllable tempo, the adaptive media file comprising first audio data associated with a first audio component of the plurality of audio components, a playback tempo range of the first audio data, second audio data associated with the first audio component of the plurality of audio components, and a playback tempo range of the second audio data, wherein the tempo range of the second audio data is different to the tempo range of the first audio data, and the first audio data, second audio data and the respective playback tempo ranges are associated with one another.

Optionally, the first audio data, the second audio data and the respective playback tempo ranges are associated by being within a file structure. Optionally, the first audio data, the second audio data and respective playback tempo ranges are associated by reference in metadata associated with the first and second audio data. Optionally, the playback tempo range of the first audio data is incorporated in metadata of the first audio data.

Optionally, the playback tempo range of the first audio data provides data representative of a lower tempo and an upper tempo. Optionally, during playback the first audio data is arranged to be presented as part of the audio output when a playback tempo is either above the lower tempo and below the higher tempo, or above or equal to the lower tempo and below or equal to the higher tempo. Optionally, the first audio data has a tempo and the data representative of the lower tempo and the upper tempo is one of the actual upper tempo and the actual lower tempo, a number of beats per minute above and a number of beats per minute below a tempo of the first audio data, or an amount by which the tempo can be shifted either above or below the tempo. Optionally, the tempo range of the first audio data defines a maximum and a minimum tempo to which the first audio data is to be time stretched.

Optionally, the first audio data and the second audio data either are first and second audio files or derived from first and second audio files. Optionally, the first audio data, second audio data and the respective playback tempo ranges are associated with one another is identified in one or more configuration files comprised in the adaptive media file. Optionally, the first audio data being associated with the first audio component of the plurality of audio components is identified within the adaptive media file. Optionally, the adaptive media file is one of an audio file or a video file comprising video frame data and associated audio data.

Thanks to the present method, the range of playback tempos over which a set of audio data may be used is reduced as an audio channel is associated with a plurality of sets of audio data that can be alternatively used based on the input playback tempo. In existing techniques, a user has to transform, using for instance a time stretching process, over a large interval of playback tempos. With the present solution, he may define a plurality of sets of audio data for a same audio channel, each set of audio data being used only over an associated and smaller playback tempo range. If an updated playback tempo selected by the user falls within a different playback tempo range, the present audio mixing solution will trigger the use of a different set of audio data, thereby reducing for instance to "over time stretch" a set of audio data.

The present method may be implemented using an electronic device like a music controller implemented on a mobile device through an application. The electronic device may also be a computer and the sound mixing solution may be controllable through an interface as described herein. The present solution may be referred to as an audio mixing controller, a playback tempo controller or simply an audio mixer.

BRIEF DESCRIPTION OF THE DRAWINGS

An arrangement will now be described in further detail, by way of example only, by reference to the accompanying drawings in which:

FIGS. 4.1 to 4.3 are alternative examples of GUIs according to another arrangement of the present audio controller;

FIGS. 5.1 and 5.2 are a flow diagram showing the general operational steps implemented by the present audio controller according to different arrangements of the present method.

DETAILED DESCRIPTION

In the present description, the term present or render will refer to the act of making a set of audio data, a music track, an audio channel or the like listenable by a user.

Figure 3:
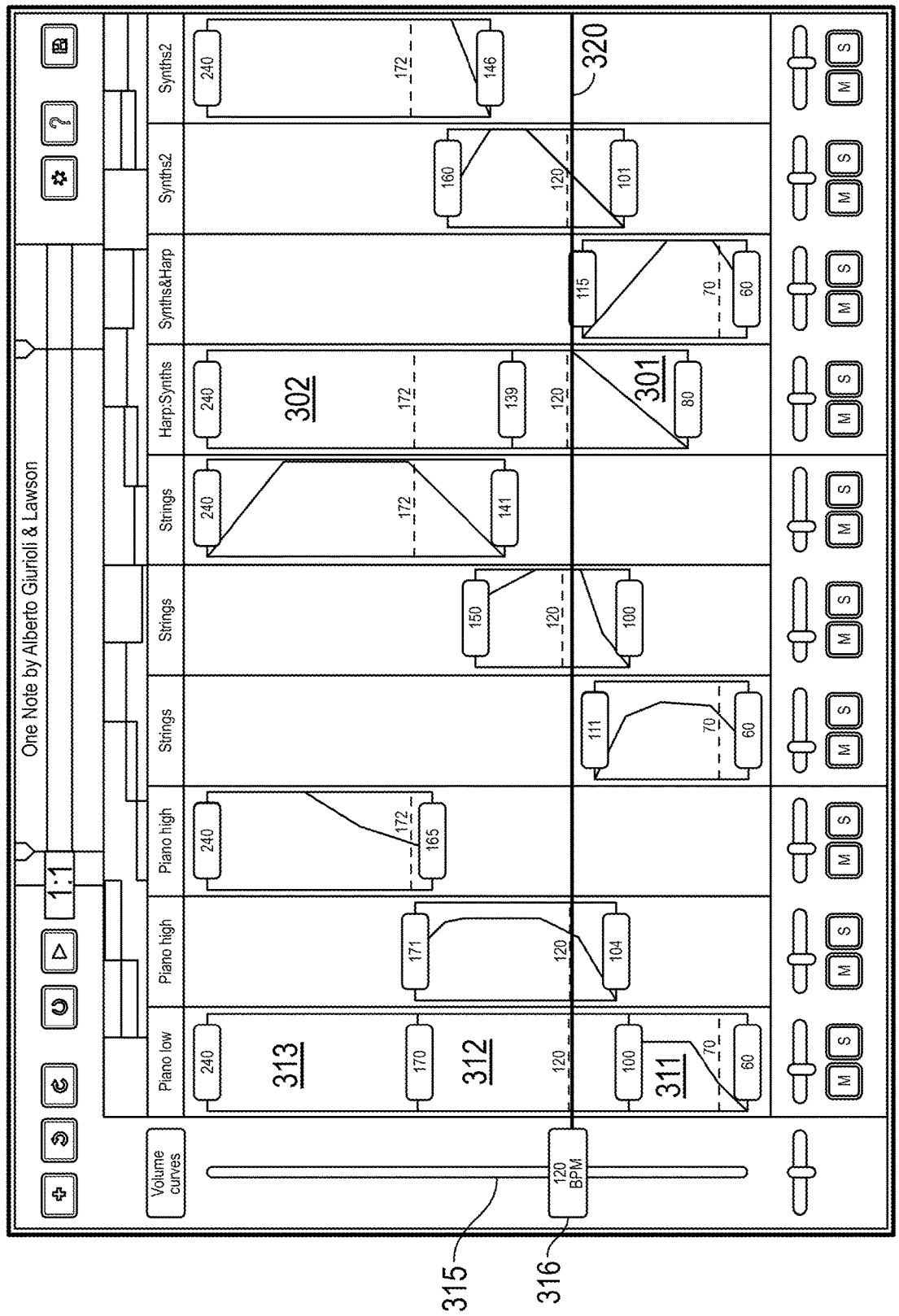
FIG. 3 is an exemplary Graphical User Interface (GUI) according to another arrangement of the present audio controller.

An audio track such as a song generally comprises one or more audio components. Each audio component corresponds to a different part of the audio track, for example different instruments, vocal etc. An illustration of an adaptive media file for producing an audio track can be seen in FIG. 3, showing an adaptive media file with 10 audio components represented by bar elements extending vertically. Audio components can each correspond to a respective audio channel, or audio components comprised of more than one set of audio data could be spread over more than one audio channel. For example, in FIG. 3, the "Piano low" audio component corresponds to a single audio channel and the "Piano high" audio component corresponds to two audio channels. The playback tempo of the track is indicated on the vertical axis.

Each audio component has one or more sets of audio data represented by different sections of the bar elements. Each section corresponds to a playback tempo range. As such, the sections do not overlap in the vertical direction and are each delimited with first and second borders in the vertical direction. Looking at the "Piano low" audio channel, 3 sections 311, 312 and 313 are respectively associated to the playback tempo ranges 60-100 bpm, 100-170 bpm and 170-240 bpm, the values being expressed in bpm. The "Harp:Synths" audio channel comprises 2 sections 301 and 302, respectively associated to the playback tempo ranges 80-139 bpm and 139-240 bpm. The playback tempo range may be seen as the range of playback tempos over which a set of audio data may be used, for a given audio component. The playback tempo ranges may be adjacent, i.e. that the highest level of a first playback tempo range corresponds to the lowest level of a second playback tempo range. In that case, the two contiguous playback tempo ranges share a common playback tempo boundary.

The sets of audio data or "stems" and their respective playback tempo ranges may be associated by placing them within a file structure or by reference in metadata associated with the sets of audio data or stems. The playback tempo range of a given set of audio data may be incorporated in metadata of the set of audio data.

Alternatively, the sets of audio data may be contained in one or more audio files, and a configuration file may define the relevant details of the files, such as playback tempo ranges and relationships between sets of data including the characteristics of transitions between sets of data, as will become apparent later.

More generally, each audio component forming the music track is associated with a plurality of sets of audio data, each set of audio data itself being associated with a playback tempo range. As the present solution allows the control of the playback tempo to present a music track at an audio output device, the choice of a playback tempo will determine which set of audio data is selected for an audio component based on the playback tempo range the chosen playback tempo belongs to. The playback tempo range may be seen as the range of playback tempos over which a set of audio data may be used, for an audio component.

During playback, a set of audio data may be arranged to be presented as part of the audio output when a selected playback tempo is above the lower tempo and below the higher tempo of the set of audio data. Alternatively, the set of audio data may be arranged to be presented as part of the audio output when a selected playback tempo is or above or equal to the lower tempo and below or equal to the higher tempo.

During recording the sets of audio data, a musician plays the same series of notes on an instrument at several tempos so as to record the necessary number of sets of audio data. Similarly, a singer sings the same melody at different speed to define a plurality of sets of audio data for a voice audio component. The different tempos in the example of FIG. 3 are 70, 120 and 172 bpm. These predetermined playback tempo values correspond to what may be referred to as native playback tempos of the respective sets of audio data. They define the playback tempo at which a set of audio data is intended to be presented (e.g. the initial tempo of the voice, instrument, beat, etc.) as the set of audio data was recorded. The native playback tempo for a set of audio data is comprised in the playback tempo range for this set of audio data.

The playback tempo range of a set of audio data may be calculated from its native tempo. For example, the range may be defined as a number of beats per minute above and a number of beats per minute below the native tempo of the set of audio data. The tempo range of the first audio data may define a maximum and a minimum tempo to which the first audio data is to be time stretched during playback.

Each set of audio data may be associated with a respective audio component of the plurality of audio components. This may be identified within the adaptive media file. The adaptive media file may be one of a set of audio data or a video file comprising video frame data and associated audio data.

The playback tempo range may be user defined based on his appreciation of the range of playback tempos over which he wants to use a recording. Say he records the three sets of audio data for the low piano mentioned at the three native speeds 70, 120 and 172 BPM, he will then associate the three tempo ranges 311, 312 and 313 respectively. Each time the user selects a playback tempo, the present solution will enable each audio component to select the sets of audio data corresponding to the playback tempo range that comprises the selected playback tempo. To that effect, the left-hand side of the GUI in FIG. 3 shows an additional bar element 315 extending in the same direction as the bar elements for the audio channels. This additional bar element may be seen as a cursor bar 315 to set a playback tempo for presenting the music track through inputs on a cursor graphical element 316. The cursor element 316 may present a label to display the BPM value corresponding to the user selection on the cursor bar 315. If a playback tempo of 120 BPM is selected as in the illustration of FIG. 3, the set of audio data corresponding to the range 312 for the low piano and the set of audio data for the range 301 for the harp will be selected and allocated to their respective audio component for presenting the music track.

As the many bar elements extending in the vertical direction may make the reading of the selected tempo range difficult for the user, the present system proposes another graphical element 320 extending in a second direction of the GUI so that it crossed all the vertical bar elements. In the illustration of FIG. 3, 10 bar elements are proposed in the vertical direction while the BPM level is set in the horizontal direction across the plurality of bar elements. Yet the user can be left in doubts about which playback tempo ranges have been selected when moving the cursor 316 to select a playback tempo horizontally across all audio channels. This is especially true for the audio components the graphical bar element of which is located on the opposite side of the interface, like the audio channels for the 2 synthesizers. The graphical element 320 is movable in the first direction, i.e. the direction of the cursor bar and of the bar elements, the motion being for instance actuated through inputs on the cursor bar 315. The graphical element 320, which may be seen as selection bar for the playback tempo ranges, extends in the horizontal direction across all bars for the audio components. Consequently, the user has a clear visual representation of which tempo ranges will be selected.

A further GUI feedback is proposed in the present system. An illustration of this GUI feedback may be seen in FIGS. 4.1 to 4.3. In the present solution for controlling a GUI of an electronic device, e.g. an audio mixer device, the processor of the device is configured, responsive to a user input for moving the cursor (graphical element) 416 of the cursor bar 415 in the first direction to:
  determine the new position of the cursor 416,
  determine for each bar element, the subparts that are crossed by the graphical element or selection bar 420,
  mark the subparts that are crossed by the selection bar 420 as active by rendering them using a first rendering mode,
  mark the other subparts as non-active by rendering them using a second rendering mode distinct from the first rendering mode.

The different rendering modes may consist in highlighting the subpart element for a selected playback tempo range as follows. The GUI of FIG. 4.1 shows a starting interface with 11 vertical bar elements for as many audio channels. As the playback has not started yet, no playback tempo range is highlighted. All the tempo ranges for the different audio channels are shown and the selection bar 420 is shown from a default starting tempo of 147 BPM on the cursor bar 415. As the user provides inputs to slide the cursor element 416 down on the cursor bar 415 to a selected value of 112 BPM as shown on the label carried by the cursor element 415, the processor will check which playback tempo ranges are provided for each audio component the selected playback tempo of 112 BPM. In the illustration of FIG. 4.2, the subpart elements 421 corresponding to these playback tempo ranges will be rendered with a first rendering mode, here in plain form, but alternatively in a highlighting with intense colors, while the other playback tempo ranges, which do not comprise the selected playback tempo, will be rendering with a distinct second rendering mode. This is illustrated in FIG. 4.2 with hatched subparts like subpart 422, but alternatively could be dimmed subparts. In an additional arrangement of the present method, the parts of a bar element for which no playback tempo range is defined, as a bar element may present discontinuities when a tempo range is not allocated to any set of audio data, may also be rendered with the same second rendering mode. Alternatively, they may be rendered with a third rendering mode, like a narrower hatching or a stronger dimming, so as to be easily ignored by the user as seen with subpart 423. The present distinct rendering modes allow the user to have a clear feedback on which subparts are active, i.e. with a corresponding set of audio data allocated to an audio component, and which subparts are non-active, i.e. with a corresponding set of audio data which does not correspond to a playback tempo range currently targeted by a user.

Another arrangement of the present GUI is shown in FIG. 4.3, wherein the selected playback tempo is now 148 BPM. This time, 7 subparts are highlighted as active as some playback tempo ranges are no longer active because the selected playback tempo has a value greater than their upper range. In this illustration, playback tempo ranges are contiguous for most audio components and upper value ranges become active with the increase in BPM requested by the user.

The present illustration proposes a cursor as the movable graphical element but other illustration using different movable graphical elements will benefit from the present teachings. Furthermore, the illustration in the context of the audio mixer is a possible use of the present GUI. Alternatively, any control for a multi-component variable may benefit from the present teachings. Indeed, if each bar element extending in the first direction represents values of a component, and that a bar element comprises one or more subparts representing value intervals, then the present GUI allows an easy selecting of the active intervals that are crossed by the selection bar. Each interval of values may be allocated a file, a function, a unique identifier or a value for instance, and the present interface allow an eased simultaneous feedback on a plurality of active intervals when the interface comprises a large number of bars of component values that would otherwise make its control more complex.

Figure 1:
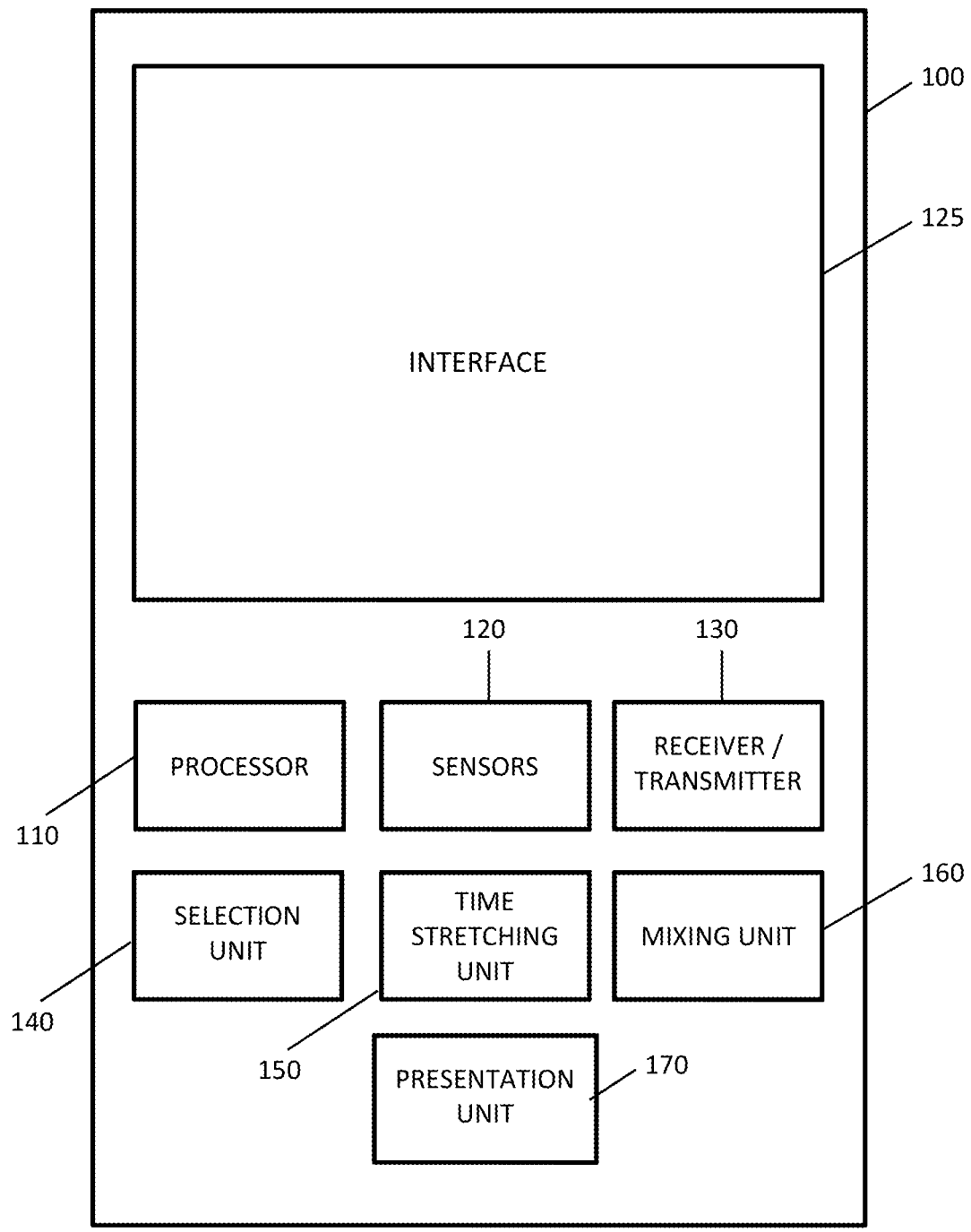
FIG. 1 is a schematic drawing of an electronic device configured to implement an arrangement of the present method.

Going back to the electronic device implementing the audio mixer or controller, an exemplary assembly for such a device is shown in FIG. 1. The present audio mixer may be implemented on an electronic device 100 illustrated here as a mobile device with a touch sensitive interface or display 125. Other sensing elements such as sensors 120 may be provided for defining such inputs as for instance a playback tempo as explained here after. The mobile device 100 further comprises a processor 110 for executing instructions of a computer program to perform the method described herein. The mobile device 100 may further comprise a receiver/transmitter unit 130 for exchanging data over a network wirelessly or not. The data exchanged may be audio data or other type of data needed to implement the present audio mixing solution. The processor 10 further controls a selection unit 140 for selecting a set of audio data from a plurality of sets of audio data based on a playback tempo received either through the touch sensitive display 125 or sensors 130. A time stretching unit 140 may be provided to implement, when needed, a time stretching of a selected set of audio data to a received playback tempo that is different than its native playback tempo. A mixing unit is also available to mix the different sets of audio data allocated to respective audio components so that a music track can be presented using the presentation unit 170 at either an output device either local (like speakers or through a jack—not shown in FIG. 1) or at a distant audio output device (e.g. the speakers 230 of FIG. 2). The audio components may be stored on a memory of the device that the processor 110 may interact with. Alternatively, the sets of audio data may be stored remotely and available through streaming to the electronic device 100 over the network and received over the receiver/transmitter unit 130.

Figure 2:
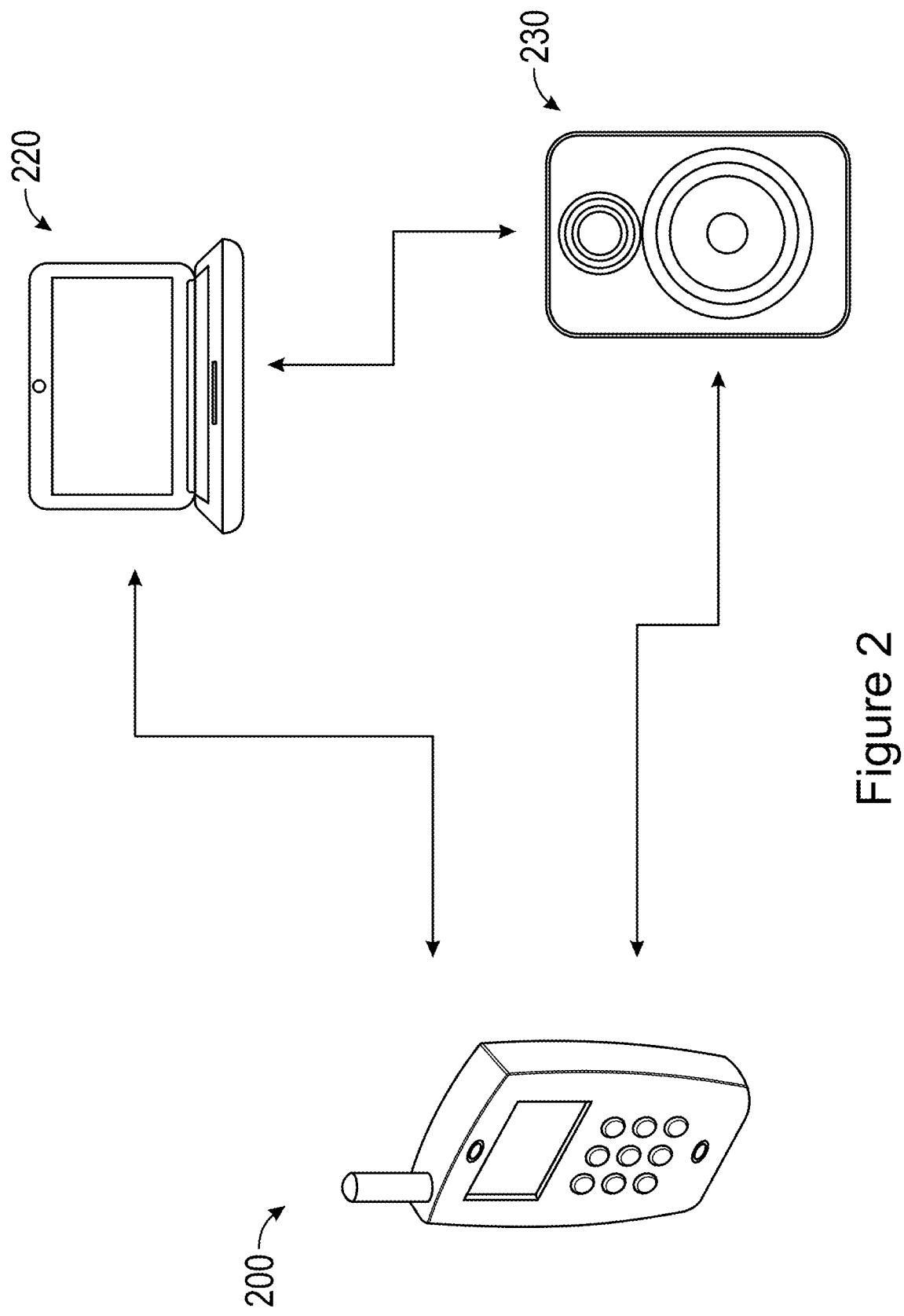
FIG. 2 is a schematic drawing of another arrangement of the present method and comprising an electronic device, a remote device, and an audio output device.

The present audio mixer may be either entirely implemented on the electronic device 100, or enabled through a client/server relationship as illustrated in FIG. 2. Indeed, FIG. 2 illustrates another instance of the present solution. An audio mixer 200 comprising a user interface 210 is arranged to receive a playback tempo for a music track. The playback tempo may be received through the user interface 210 or alternatively through sensing units, like a gyroscope, an accelerometer, or a GPS chip to measure location . . . , so that a rhythm of displacement may be calculated. This may be the case when the user is jogging while carrying the audio mixer or controller 200 enabled on a mobile device. The pace he's running at will determine a rhythm to synch and control the music he's listening to through connected headphones.

In this arrangement, the audio mixer 200 is only capturing the playback tempo input, while the music is streamed from the distant server 220. More precisely, the audio component management as well as the selection of the relevant playback tempo ranges and corresponding sets of audio data may be carried out at the distant server 220 which also manages accesses to databases (not shown in FIG. 2) where the sets of audio data are stored. The audio output device is illustrated as speakers 230 that the server or the audio mixer 200 may interact with when a jack output of the mobile device is not used.

The present audio mixing method will now be illustrated in relation to FIG. 5 showing a flowchart of the different operations or steps to carry out the method.

FIG. 5.1 is an illustrative flowchart of the present method according to a first arrangement. The method may be carried out by a processor of the electronic device 100 of FIG. 1, or alternatively by the processor of the distant electronic device like server 410. In an initiation step 500, once a music track is chosen, the different sets of audio data for the music track are loaded from the memory 120 of the user device 100. Alternatively, the sets of audio data may be streamed them over the air in any available standard audio format or downloaded from a remote memory.

As discussed above, each set of audio data corresponds to an audio component. Each component corresponds to part of a music track such as an instrument, a beat, or one or more voices. Each component may be allocated to a single audio channel or, if a component is made up of a number of sets of audio data, a number of channels. Each of the sets of audio data is associated with a playback tempo range. In the instance that more than one set of audio data is loaded for a given component, each set of audio data covers a different tempo range. An set of audio data may further be associated to a native playback tempo corresponding to the initial tempo it is intended to be presented at, e.g. a tempo it was recorded at.

A set of audio data associated to a playback tempo range is also referred hereafter as a stem. A stem corresponds in FIG. 3 to any subpart of a graphical bar element.

A user may choose to enable or disable the time stretching for a stem when initiating the present audio mixer. When the time stretching is disabled, a selected playback tempo chosen over a playback tempo range will not affect the presentation of a set of audio data. Time stretching is the process of changing the speed or duration of an audio signal without unduly affecting its pitch so as to keep the song "familiar" to an ear besides the change of playback tempo.

Take a song, originally recorded and mixed at an original 79 BPM which has been mixed by different DJs at a lower playback tempo of 65 BPM, and also remixed at its original tempo of 79 BPM and at a faster tempo of 95 BPM. The generation of the three different music tracks may be either by recording original arrangements at the proposed playback tempos or mixed using different time stretching techniques or other techniques to alter the playback tempo a song may be presented at. If the song is available with another dozen audio components, a user will be able, for each audio component and for each of the three arrangements, to generate 12*3=36 files having playback tempo ranges of varying amplitudes around the 3 respective native tempos of 65, 79 and 95 BPM. Such audio component generation may be seen through the GUI of FIG. 3.

An audio component is now associated to a plurality of sets of audio data and their respective playback tempo range, and a native playback tempo it is initially intended to be presented at.

In the example of FIG. 5.1, no time stretching is performed. This may be achieved for instance through the deactivation of the time stretching option mentioned before. Alternatively, the user may simply choose to discard any side effects related to a change in playback tempo.

In a further step 510, the processor 110 will receive a playback tempo for presenting the music track, for example in one of the manners discussed above in the context of running. Each time the user inputs a playback tempo the present solution enables the selection of a set of audio data having a playback tempo range that comprises the input playback tempo for each audio component. Steps 520 to 550 are now described generally for a first audio component.

In step 520, the processor 110 determines whether or not a set of audio data exists for the audio component that has a playback tempo range comprising the received playback tempo. If so, it will then at a further step 530 select the associated to the playback tempo range comprising the received playback tempo. In a subsequent step 540, the processor will allocate the selected set of audio data to the first audio component for presenting at a later step 560 the music track at the audio output 160 of the user device 100.

As the music track comprises one or more additional audio components that form, with the first audio component, a plurality of audio components, the presentation of the music track comprises mixing of the plurality of audio components at step 550. As with the first audio component, each component is associated to at least one set of audio data, and each set of audio data to a playback tempo range. As with the first component, the steps 520 to 550 for the first component are repeated for other component, as illustrated in FIG. 5.1 with steps 522 to 552 for a second audio component. In other words, for each additional or current audio component, the steps of:

identifying and selecting, from a plurality of sets of audio data associated with a given audio component, a set of audio data that is associated to a playback tempo range comprising the received playback tempo; and allocating the selected set of audio data to the given audio component for presenting the music track at the audio output 160 of the user device;

are repeated.

The user may change the playback tempo at any point in the track. If a new playback tempo is received at step 570 (answer "Yes" to step 570), the process will return to step 510 to update the playback tempo range for each audio component and consequently change sets of audio data as necessary. In the present solution, a given audio component may comprise two consecutive playback tempo ranges that may be contiguous and share a common playback tempo boundary. When this common playback tempo boundary is crossed due to an increase in the input playback tempo, the selected set of audio data will change. In this situation, the update in playback tempo will cause the processor 110 to "turn off" the currently selected set of audio data and "turn on" the set of audio data associated to the playback tempo range that the updated playback tempo belongs to.

In the example of FIG. 3, if the playback tempo is changed from 120 bpm to 100 bpm, the section of the "Piano high" audio component which ranges from 104-171 bpm is stopped. The section of the "Synths & Harp" audio component which ranges from 60-115 bpm is started.

If the new playback tempo falls on a shared boundary between two sets of audio data of an audio component, as is the case for the "Piano low" audio channel in the example of FIG. 3, the processor will use fade parameters to effect a cross-fade between the two adjacent sections. The fade parameters include a parameter stating whether the fading should start immediately after the playback tempo crosses the threshold bpm value, or whether the start should be delayed until the first beat of the next bar. The fade parameters also include a parameter specifying how quickly or slowly the fade should take place.

When no updated playback tempo is received at step 570 (answer "No" to step 570), the process will carry on presenting the music track with the current sets of audio data that are mixed in step 560.

If an input playback tempo does not exactly match the native tempo of a set of audio data, but falls within the tempo range of that set of audio data, a user may choose to enable time stretching for a set of audio data when initiating the present audio mixing. Time stretching is the process of changing the speed or duration of an audio signal without affecting its pitch so as to keep the song "familiar" to an ear besides the change of playback tempo. When the time stretching is disabled, as in the example of FIG. 5.1, an input playback tempo chosen over a playback tempo range will not affect the presentation of a set of audio data.

FIG. 5.2 shows an example of the present audio mixing solution where time stretching is enabled by the user. The steps in this additional arrangement are similar to the steps of the arrangement shown in FIG. 5.1, except for the allocating of steps 540 and 542 of FIG. 5.1 which are replaced respectively with steps 541 and 543.

Steps 541 and 543 respectively describe a time stretching process that is performed for a given set of audio data in the case that the input playback tempo differs from the native playback tempo of the set of audio data. More precisely, for a currently selected set of audio data, the processor 110 of the user device 100 will perform a time stretching process of the selected set of audio data, the time stretching process comprising transforming the selected set of audio data to produce a modified set of audio data intended to be presented at the input playback tempo with a controlled pitch. The modified set of audio data is then used in place of (or as) the selected set of audio data for allocating to the audio component.

In the example of FIG. 3, at a playback tempo of 95 bpm, the audio mixer will pick only the "Piano low" channel, the first "Strings" channel, the "Harp:Synths" channel and the "Synths & Harp" channel. The sets of audio data in these components have respective native playback tempos of 70 bpm, 70 bpm, 120 bpm and 70 bpm. Therefore, the sets of audio data are stretched from 70 to 95 bpm, except for the "Harp:Synths" set of audio data which is stretched from 120 down to 95 bpm.

Different techniques are available to the person skilled in the art in steps 541 and 543 to time stretch a set of audio data from its native playback tempo to generate a modified set of audio data intended to be presented at the received playback tempo. Similarly many techniques are available for the mixing step 551 of FIG. 5.2 in order to make the arrangement of the music track even more pleasing to the ear. These solutions are beyond the scope of the present description. Yet in the present solution, by limiting the impact of playback tempo ranges which may be too large for adequate time stretching, an improved playback tempo controller is proposed to a user.

The mixing step 550 of FIG. 5.1, which involves the mixing of the selected sets of audio data, is replaced in this additional arrangement of FIG. 5.2 with the mixing step 551, wherein the modified sets of audio data are mixed. Once mixed, the modified sets of audio data are mixed in step 551 into the music track intended to be presented at the received playback tempo, the present method is carried on at step 560 with presenting the music track for instance at the audio output 160 of the user device 100. As with the arrangement of FIG. 5.1, the processor will carry on at step 570 with monitoring if a new playback tempo value is received.

When no new playback tempo is received (answer "No" to step 570), the present method will carry on with mixing the different audio components to present the music at the audio output 160 in step 560.

If an updated playback tempo is received (answer "Yes" to step 570), the processor 110 will consider the updated playback tempo as the new current playback tempo. It will carry on with repeating the steps 510 to 560 of FIG. 5.2 already described. In this case, two scenarios may unfold.

In the first scenario, the updated playback tempo is comprised within the same playback tempo range as the previous playback tempo such that there is no need to change the selected set of audio data. The updated playback tempo will instead impact the time stretching and the modified set of audio data requires an update. Indeed, using the same selected set of audio data as with the previous playback tempo, an updated modified set of audio data intended to be presented at the updated playback tempo is produced by time stretching the previous modified set of audio data, and the previous modified set of audio data allocated to the audio component is replaced with the updated modified set of audio data.

In the second scenario, the updated playback tempo is comprised in a different playback tempo range such that there is a need to change the selected set of audio data. This happens when the update playback tempo crosses a playback tempo boundary, for example between two contiguous playback tempo ranges. The processor 110 will then turn off the modified set of audio data and, if a set of audio data exists with a playback tempo range corresponding to the new playback tempo, turn on the set of audio data associated to the new playback tempo range. This is done prior to performing any time stretching that may be required to account for any difference in the updated playback tempo and the native playback tempo of the newly selected set of audio data.

When a change in sets of audio data occurs for an audio component, the rendering of the music track may be affected due for instance to the sudden change in set of audio data or a missed beat. Different solutions are presented here after to account for this situation. They will be illustrated in relation to the arrangement of the audio mixing solution of FIG. 5.2 when time stretching is involved, but may also be used when time stretching is not used or disabled.

Let us assume that the updated playback tempo is received at a first time instant, say 2 minutes, into the presentation of the music track. Then the presentation of the music track using the updated modified set of audio data for an audio component will take into account the first time instant, so as to make the presentation of the track gapless or continuous, despite the change in set of audio data.

The first time instant is used to determine, when a playback tempo threshold is crossed, the timing of turning off the previous set of audio data for the audio component that saw the threshold crossed (e.g. low piano channel at playback tempo of 100 bpm between intervals 311 and 312 in the example of FIG. 3) and turning on the updated modified set of audio data to be used instead.

In an additional arrangement of the present method, the user may define a cross fade between the previous modified set of audio data and the updated modified set of audio data, the cross fade being initiated after the first time instant. Consequently the turning off of the previous modified set of audio data may be carried out over a pre-set duration so as to soften the transition.

Additionally, as the received updated playback tempo causes a change in tempo range, the music track using the updated modified set of audio data may be presented using a delay after the first time instant. The delay may be defined in terms of a number of completed beats. The playback tempo that defines the speed at which a music track is presented can be seen as an interval of time between beats of the music track. The delay may be a function of a pre-set number of completed beats, measured either using the previous playback tempo or the updated one.

The transition from one set of audio data to the other may also control the volume associated with each set of audio data. Referring back to FIG. 3, each section, representing a set of audio data, is associated with a volume curve extending in the horizontal direction. When looking at the sections 301 or 311, the left-hand side of the sections will define a minimum value of e.g. 0 for the volume of the set of audio data, while the right-hand side edge will define a maximum value of e.g. 1. As may be seen from sections 301 and 311, a volume value, for instance comprised in the interval [0-1] or any other value range, may be defined for each playback tempo of the playback tempo range. The volume values define a volume curve over the tempo range, which may be used as an additional control over the sets of audio data. It may be advantageously used in the context of a transition between sets of audio data at a playback tempo threshold by reducing the volume closer to an upper limit of a first playback tempo range, and increasing the volume when moving to higher playback tempo values away from the lower limit of a second playback tempo range.

The volume curve may also be used to reduce the volume of a first set of audio data on the extremities of a playback tempo range of the first set of audio data, especially if no other set of audio data is available contiguously to the first sets of audio data.

The present audio controller enables for the creation of adaptive music and lets users/listeners change the playback tempo of a music track in real time at any point in the track without restrictions on the tempo range and without poor performance in .at certain tempos. Using the present audio mixing solution, the listener can make adaptive tracks sound better at any tempo without the need of an expert or remixing professional.

While interesting in its own right, this type of adaptive music is particularly suited to specific activities. For example, a mobile running app could automatically adjust the tempo of an adaptive track to match the listener's running speed, or guide her through an interval training session by changing the tempo of the adaptive track at the right points in her workout. A skiing app might make the speed of the track depend on the skier's speed: slow and grinding at the top of the hill; but faster and more pumping the faster she skies downhill. At your dance party, take turn controlling the tempo of the music and everyone is dancing to your beat. At a dance class, the instructor explains the choreography in slow tempos and as the dancers get acquainted with the steps she speeds up the music. And so on.

As explained in the present disclosure, to make a music track adaptive, the track is composed of a collection of stems, and a description of how the arrangement of those stems should change with the playback tempo. At any given playback tempo, the artist can control which stems should play and which shouldn't, how stems transition when they begin or end their playback, and each stem's relative volumes. This control is easily achieved using the exemplary GUI of FIG. 3 and further control over the characteristic of each subpart/stem by varying for instance the playback tempo range of a stem, its native playback tempo, its volume, whether time stretching is enabled.

The audio controller will simply import the stems from a local storage or stream them over the air in any available standard audio format.

As seen in FIG. 3, each colored box or subpart represents a single stem in the track and boxes are grouped vertically in bar element associated to an audio component. The illustration of FIG. 3 is made of 3 piano channels and 5 stems, 3 string channels and 3 stems, 4 harp/strings channel and 5 stems. Each stem is recorded in one of three separate native tempos: 70, 120 and 172 bpm.

The tempo thresholds of each stem tell the audio controller the playback tempo range in which the stem should play. Now for a particular playback speed, the present audio controller picks the appropriate set of stems to play for each audio component, time stretches each from their native speed to the playback speed, and mixes the result together for playback to the listener. For example, at playback speed 112 bpm (as in FIG. 4.2), the audio mixer will pick all the mid-tempo stems and stretch them from their native 120 bpm to the playback tempo of 112 bpm before mixing and playing back the result.

Going back to FIG. 3, at playback speed 85 bpm, the audio mixer will pick only the low piano channel, first string, and first and second harp/synthesizer. These stems are stretched from 70 to 95 bpm, except for the first harp/synthesizer which is stretched from 120 down to 95 bpm.

The listener may change the playback speed at any point in the track. When one of a stem's tempo thresholds is crossed, the audio controller will stop or start playback of that stem as appropriate. As explained before, how the transitions should occur may be specified using for instance the stem's cross fading.

The present audio controller provides adaptive listening experience, the best when the vibe/genre/feel/sound/etc is as different as possible at different tempo ranges. The idea is similar to remixing a music track at a different tempo from the original. In general the listener would not want the remix to simply sound like the original playing at a different tempo, but rather pick a new genre/sound for your remix suitable for the new tempo. Using the present sound mixing solution, the user can add extra or choose varying stems for a given audio component so that the change in playback tempo will smoothly and gradually will lead the music track to change entirely in character as well.

Thanks to the present solution, a song like Hello from Adele can sound like a dreamy ballad at the slow tempos, an upbeat hip-hop track in the mid ranges, and then switch to an EDM style at higher tempo.

The applicant has found that a music track, using the present playback tempo control solution, will sound good over a very wide range of tempos: for instance from 60 to 240 bpm and above. This allows transitions from walking at a low BPM to running at around 140 steps per minute, to long distance runners typically ran at a sustained 180 steps per minute and sprinting that happens well above 200 steps per minute. Many other activities for a listener will require adapting music at less extreme tempo needs.

While the above description discusses a system in which audio data is played, it will be appreciated that these principles apply to any application or media utilising audio. For example, video includes video frames and audio data as component parts of the overall video. This application could be applied to the audio parts of that video. As a result, many of the beneficial applications relating to running, skiing or other sports could be provided within a gym setting in which the user can listen to the audio and also watch associated visuals. The concept of changing a tempo of audio elements responsive to a user input change could also be applied to video frames.

The examples of audio applications provided throughout this document relate to music. However, it will be appreciated that the applications discussed could apply to other types of audio. For example, these principles could be applied to an audio track comprising audible instructions to a runner that have a rhythm, such as "left, right, left, right". These instructions could then vary depending on characteristics related to tempo.

Also provided is a method for controlling a user interface (UI) rendered on a display device of an electronic device, the UI comprising a plurality of media components each extending in a first direction parallel to one another and comprising one or more media elements, each media component arranged to be combined to provide an output when in a playback mode of operation, a plurality of first media elements of a first media component of the plurality of media components, each first media element being delimited in the first direction by first and second ends representative of lower and upper tempos at which the plurality of first media elements are to be played, and a graphical element movable in the first direction responsive to a user input, the graphical element representative of a tempo at which to play the plurality of media components when in the playback mode of operation, a processor of the electronic device being configured, responsive to a user input for moving the graphical element in the first direction to determine a current position of the graphical element, and determine, for the first media component, a first media element of the plurality of first media elements for which the graphical element is between the first and second ends in the first direction, wherein the first media element is thereby selected to form part of the combination of media components for the output when in the playback mode of operation.

The selected media element may be highlighted. Other media elements for which the graphical element is between the first and second ends in the first direction corresponding to other media components may also be highlighted. The graphical element may have at least a portion that extends in a second direction intersecting each of the plurality of channels. An intersection between the graphical element and a media element may be representative of the fact that that media element is selected to form part of the combination of the media components for the output. The second direction may be perpendicular to the first direction.

It will be appreciated that the method of controlling the UI may be combined with various other aspects of the present disclosure both described herein and defined within the claims.

An electronic device may be provided arranged to provide the device functionality described above.

A computer readable medium may be provided comprising computer readable instructions configured, in use, to enable a processor to perform the method for controlling the UI described above.

Figure 6:
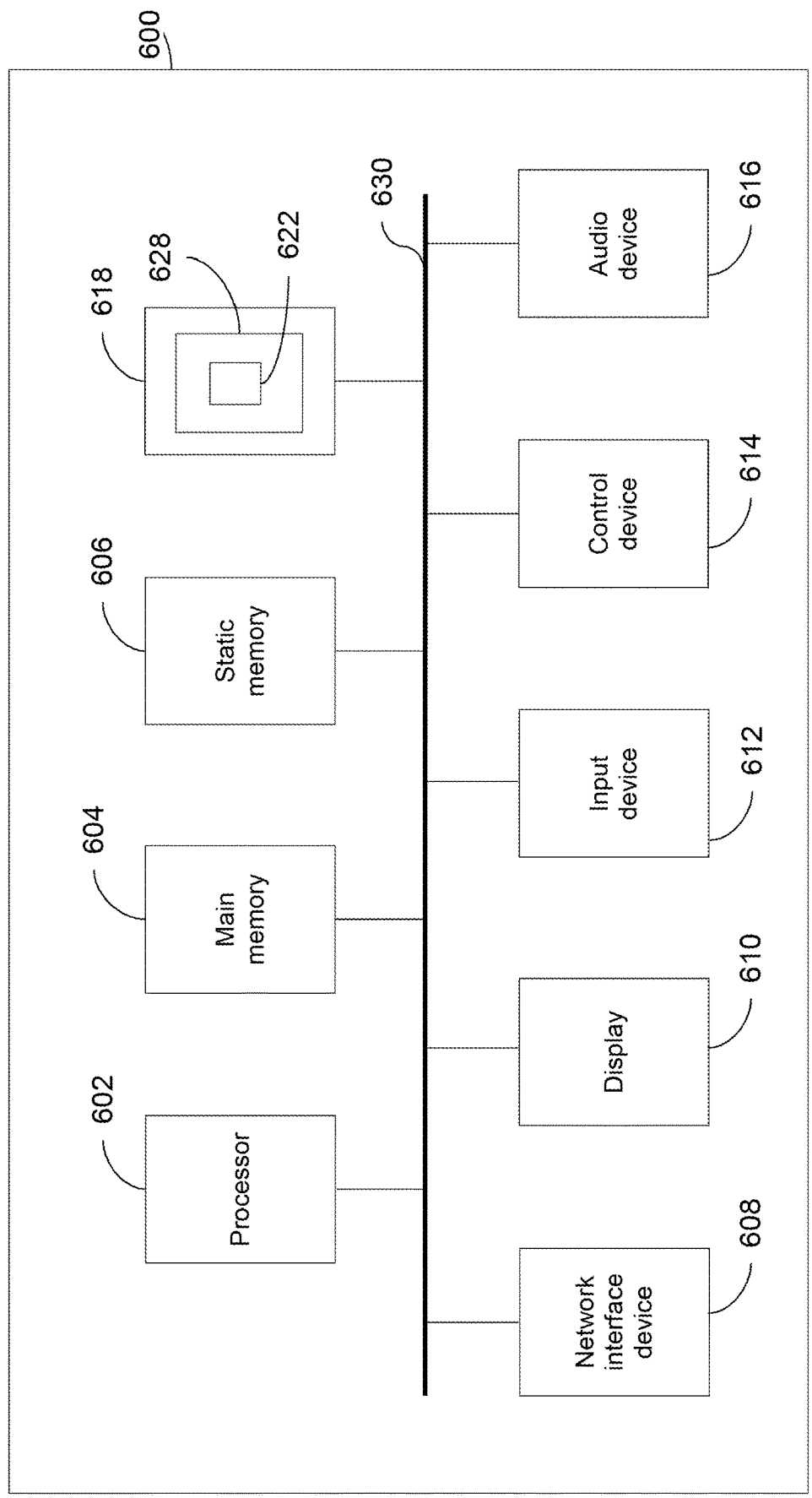
FIG. 6 illustrates a block diagram of one implementation of a computing device.

FIG. 6 illustrates a block diagram of one implementation of a computing device 600 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard or touchscreen), a cursor control device 614 (e.g., a mouse or touchscreen), and an audio device 616 (e.g., a speaker).

The data storage device 618 may include one or more machine-readable storage media (or more specifically one or more non-transitory computer-readable storage media) 628 on which is stored one or more sets of instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining", "identifying", "selecting", "allocating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method for constructing an adaptive media file associated with an audio output, the method comprising:
   identifying a first audio component;
   providing first audio data associated with the first audio component;
   setting a first playback tempo range of the first audio data;
   providing second audio data associated with the first audio component;
   setting a second playback tempo range of the second audio data, wherein the first playback tempo range is different than the second playback tempo range; and
   associating the first audio data, the second audio data and the respective playback tempo ranges such that the first audio data is arranged to be presented as part of the first audio component when the audio output is played in the first playback tempo range and the second audio data is arranged to be presented as part of the first audio component when the audio output is played in the second playback tempo range.

2. The method according to claim 1, wherein the first audio data, the second audio data and the respective playback tempo ranges are further associated by placing them within a file structure.

3. The method according to claim 1, wherein the first audio data, the second audio data and respective playback tempo ranges are further associated by reference in metadata associated with the first and second audio data.

4. The method according to claim 1, wherein the playback tempo range of the first audio data is incorporated in metadata of the first audio data.

5. The method according to claim 1, wherein the first playback tempo range extends between a first lower tempo and a first upper tempo inclusive, or extends between the first lower tempo and the first upper tempo exclusive.

6. The method according to claim 5, wherein the second playback tempo range extends between a second lower tempo and a second upper tempo inclusive, or extends between the second lower tempo and the second upper tempo exclusive.

7. The method according to claim 6, wherein the first upper tempo is equal to the second lower tempo, or the first lower tempo is equal to the second upper tempo.

8. The method according to claim 1, wherein the first playback tempo range defines a maximum and a minimum tempo to which the first audio data is to be time stretched.

9. The method according to claim 1, wherein the providing is achieved by one or more of: recording sound to form the audio data; creating the audio data using an audio production tool; or importing the audio data.

10. The method according to claim 1, wherein the first audio data and the second audio data either are first and second audio files or derived from first and second audio files.

11. The method according to claim 10, wherein associating the first audio data, the second audio data and the respective playback tempo ranges is based on one or more configuration files comprised in the adaptive media file.

12. The method according to claim 1, wherein the first audio data being associated with the first audio component of the plurality of audio components is identified within the adaptive media file.

13. The method according to claim 1, wherein the adaptive media file is one of an audio file or a video file comprising video frame data and associated audio data.

14. A computer readable medium comprising computer readable instructions configured, in use, to enable a processor to perform the method of claim 1.

15. An adaptive media file associated with an audio output, the adaptive media file comprising:
   first audio data associated with a first audio component;
   a first playback tempo range of the first audio data;
   second audio data associated with the first audio component; and
   a second playback tempo range of the second audio data; wherein
   the first playback tempo range is different than the second playback tempo range; and
   the first audio data, second audio data and the respective playback tempo ranges are associated with one another such that the first audio data is arranged to be presented as part of the first audio component when the audio output is played in the first playback tempo range and the second audio data is arranged to be presented as part of the first audio component when the audio output is played in the second playback tempo range.

16. The adaptive media file according to claim 15, wherein the first audio data, the second audio data and the respective playback tempo ranges are further associated by being within a file structure.

17. The adaptive media file according to claim 15, wherein the first audio data, the second audio data and respective playback tempo ranges are further associated by reference in metadata associated with the first and second audio data.

18. The adaptive media file according to claim 15, wherein the first playback tempo range is incorporated in metadata of the first audio data.

19. The adaptive media file according to claim 15, wherein the first playback tempo range extends between a first lower tempo and a first upper tempo inclusive, or extends between the first lower tempo and the first upper tempo exclusive.

20. The adaptive media file according to claim 19, wherein the second playback tempo range extends between a second lower tempo and a second upper tempo inclusive, or extends between the second lower tempo and the second upper tempo exclusive.

21. The adaptive media file according to claim 20, wherein the first upper tempo is equal to the second lower tempo, or the first lower tempo is equal to the second upper tempo.

22. The adaptive media file according to claim 15, wherein the first playback tempo range defines a maximum and a minimum tempo to which the first audio data is to be time stretched.

23. The adaptive media file according to claim 15, wherein the first audio data and the second audio data either are first and second audio files or derived from first and second audio files.

24. The adaptive media file according to claim 23, wherein the first audio data, second audio data and the respective playback tempo ranges are associated with one another is identified in one or more configuration files comprised in the adaptive media file.

25. The adaptive media file according to claim 15, wherein the first audio data being associated with the first audio component of the plurality of audio components is identified within the adaptive media file.

26. The adaptive media file according to claim 15, wherein the adaptive media file is one of an audio file or a video file comprising video frame data and associated audio data.

\* \* \* \* \*